United States Patent Office 3,406,026
Patented Oct. 15, 1968

3,406,026
METHOD OF SUPPLYING BLAST FURNACE WITH SOLID FUEL AND OIL SUSPENSION
Raymond G. Limpach, Luxembourg, Luxembourg, assignor to Central National de Recherches Metallurgiques, Brussels, Belgium
Filed July 8, 1963, Ser. No. 293,316
Claims priority, application Luxembourg, July 18, 1962, 42,088; Apr. 12, 1963, 43,555
3 Claims. (Cl. 75—42)

This invention consists in a method of supplying a blast furnace or a shaft furnace with solid fuel in which the solid fuel is made into a suspension with oil and the suspension is placed in a vessel which is pressurized with gas so as to force the suspension into the blast furnace.

Further details of the method and of an apparatus for carrying it out will now be described with reference to the attached drawings.

Figure 1:
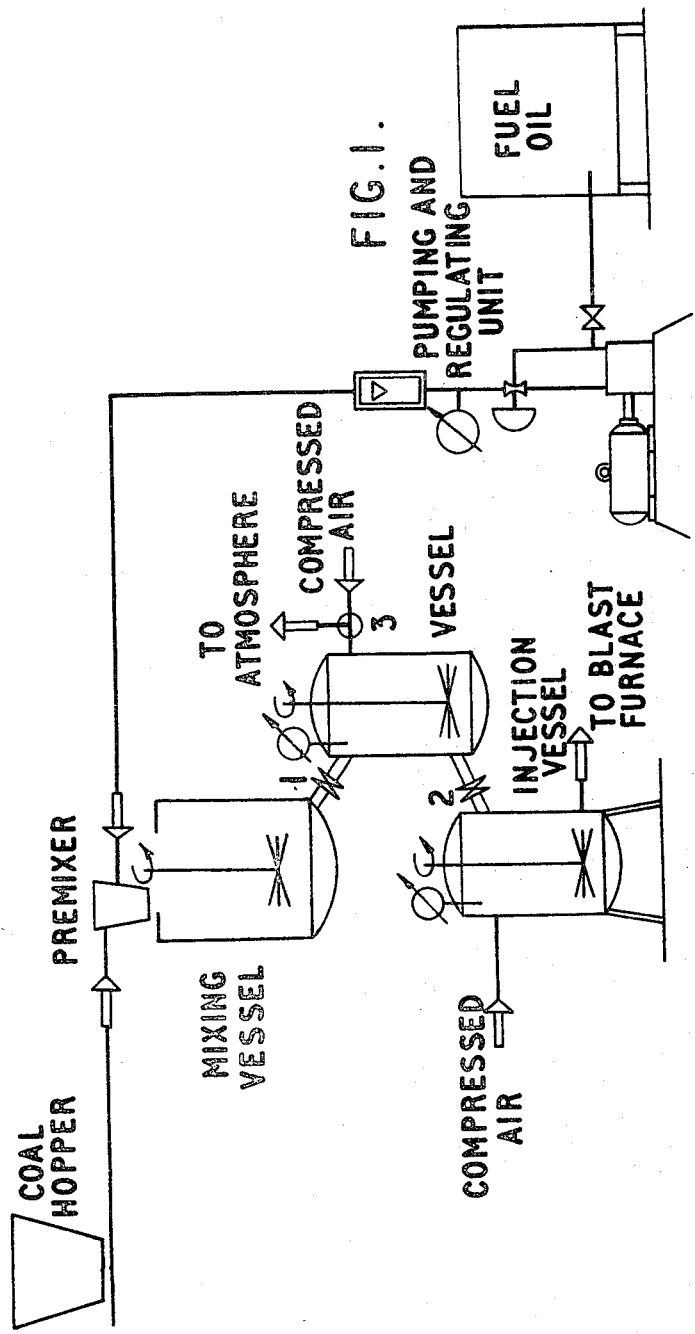
FIGURE 1 is a general diagram of the apparatus.

In the apparatus shown in FIGURE 1 the coal such as anthracite coal is stored in a hopper of 250 liters and from this hopper it passes to a pre-mixer. Fuel oil such as extra heavy fuel oil is supplied from a reservoir of 3,000 liters capacity by the pumping and regulating unit and is heated to 80° to 100° C. before it reaches the pre-mixer. It is supplied to two spray nozzles on opposite sides of the pre-mixer so as to produce a cloud of fine droplets. The solid fuel is allowed to fall freely through this cloud of droplets and be mixed with the oil. It falls into a mixing vessel of 350 liters capacity and is stirred in it by a helical stirrer rotating at 250 to 500 r.p.m. This prevents the formation of agglomerations of coal. It is to be pointed out that by introducing a solid fuel into the fuel oil cloud issuing from the spray nozzles, the fuel particles are coated with a film of liquid fuel oil before they fall into the mixing vessel. This action greatly facilitating the formation of the suspension of coal in fuel oil and in effect reducing the agitating time in the mixing vessel.

From the mixing vessel the suspension of coal in fuel oil passes through a plug valve with an aperture of 80 mm. and runs into a pressure vessel of 200 liters capacity. The suspension can then pass through a plug valve 2 with an aperture of 50 mm. into an injection vessel of 200 liters capacity. Both these two latter vessels are provided with helical stirrers and all the vessels are provided with steam jackets with thermostats, thermometers, and pressure gauges.

From the injection vessel the suspension passes into one or more tuyeres of the blast furnace. The injection vessel is provided with a compressed gas inlet which is connected with means for keeping the pressure in that vessel proportional to and higher than, the pressure of the blast being blown into the tuyeres of the furnace. For instance if the pressure in the blast main supplying the tuyeres is 500 mm./Hg the pressure in the injection vessel is 1,200 g./cm.².

The temperature in the three vessels are controlled by magnetically operated valves on the steam inlets of the steam jackets.

Figure 2:
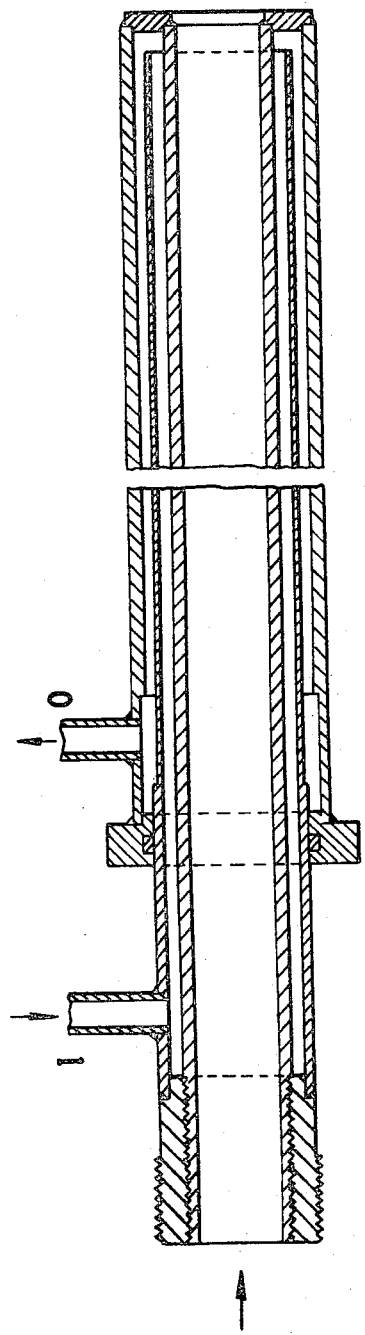
FIGURE 2 shows an injector for suspension.

The injector, which is shown in FIGURE 2, is connected with the injection vessel by a duct 18 meters long and of 1 inch bore. The duct has three elbow bends with a radius of 0.5 meter. The injector itself is inserted into the side of the blowpipe so as to inject the suspension along the axis of the tuyere. In order to prevent cracking of the oil in the suspension the injector is provided with a cooling jacket with an inlet I and an outlet O. Water or air can be used for cooling. The bore of the injector is 21 mm. while the length is 1.150 meters. If air was used for cooling its temperature at the outlet O was 200° C.

Figure 3:
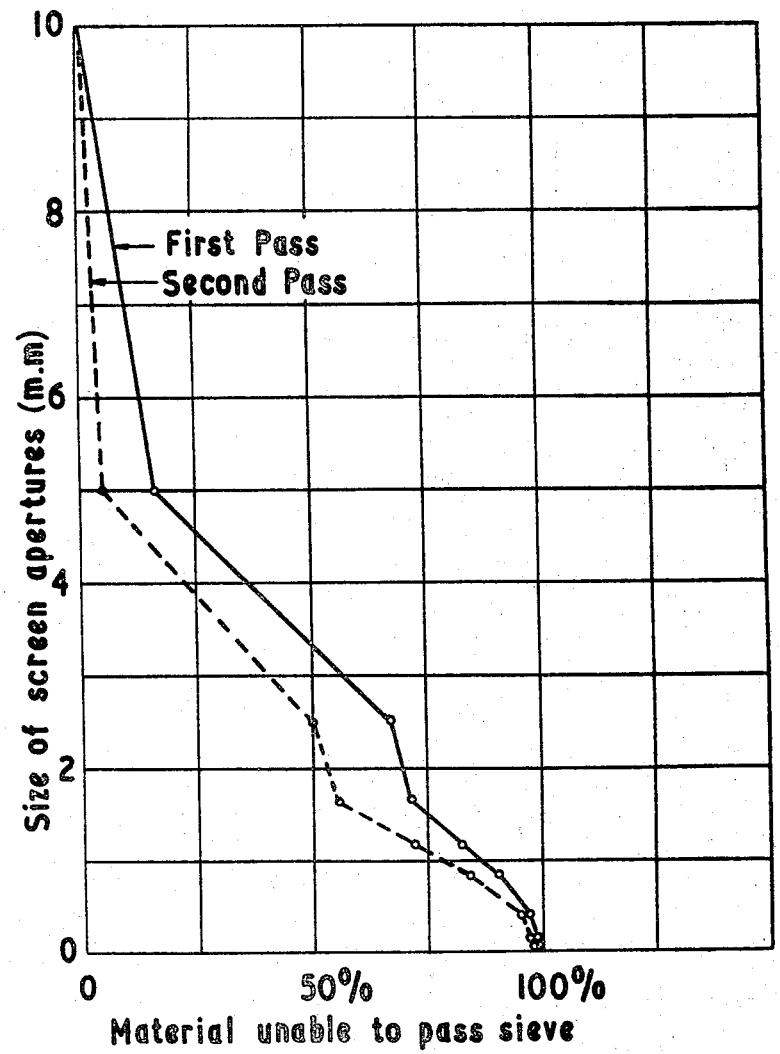
FIGURE 3 is a graph indicating a distribution of particle sizes in solid fuel injected into a blast furnace.

The operation of the apparatus was as follows:

Anthracite with a moisture content of 10% and the particle size distribution shown in FIGURE 3 (up to ⅜″) and was placed in the coal hopper. The graph in FIGURE 3 indicating the percentage distribution of particles of coal. In other words, this graph indicates that all of the coal will pass through a sieve having openings of 10 mm. in size, ⅜ of an inch being equivalent of 9.525 mm. To make up a batch of suspension or slurry the valve 1 was closed and one third of the oil required for the batch was placed in the mixing vessel. The rest of the oil was then sprayed onto the anthracite as it fell through the pre-mixer. After all the coal and oil for the anthracite had been added, the mixer of the vessel was operated for five minutes. Valve 2 was then closed and the three way valve 3 was moved into a position so as to connect the second vessel with the atmosphere. Valve 1 was then opened and the suspension or slurry passed into the second vessel by gravity. During this time all the stirrers of the vessels were operated. Valve 1 was then closed and the second vessel was put under a pressure above that of the atmosphere by operating valve 3. After this the valve 2 was opened and the slurry flowed into the injection vessel. As soon as the valve 1 was closed the operation of the pre-mixer was continued. The pressure in the second vessel and in the injection vessel was controlled by regulation valves and the supply of air to them was controlled by magnetic valves. When a batch of slurry passed into the injection vessel the valve 2 was closed and air was blown into the injection vessel so as to cause the suspension to flow into the tuyere of the blast furance. The suspension contained, for example, 65% by weight of coal. The rate of injection could be varied between 130 kilograms per hour to 400 kilograms per hour and on one occasion the rate of 800 kilograms per hour was maintained for 30 minutes. In all cases the combustion of the slurry or suspension was complete.

The temperature of the suspension depended on the type of oil used and the size distribution of the coal. Temperatures between 60° and 120° C. were found to be satisfactory in many cases.

If the coal content of the suspension was in the stated range of 65%, then the suspension temperature should be between 90° and 110° C.

One of the advantages of the improved method of injecting solid fuel into a blast furnace is the ease with which the rate of injection can be changed in function of the pressure in the injection vessel.

A further advantage is that the humidity of the coal, instead of causing foaming in the vessels (such foaming is prevented by the stirrers) improves the combustion of the suspension by its sudden vaporization in the tuyere.

While I have endeavoured to present a full and complete account of my invention so that those skilled in the art may be able to make use of, it is to be understood that the scope of the monopoly claimed in the United States is not to be limited to the process and apparatus details described with reference to the attached drawings, but is to be defined by the scope and gist of the following patent claims.

I claim:

1. A method of supplying a furnace with solid fuel comprising the steps of; allowing particles of the solid fuel to fall freely; spraying oil onto the solid fuel particles as they are falling thereby forming a cloud of droplets of the oil around the falling solid fuel; passing the thus-mixed and falling oil and particles of solid fuel into a vessel containing oil; stirring the mixed oil and particles and feeding the mixture to the furnace.

2. A method of supplying a blast furnace with solid fuel, comprising the steps of; dropping solid fuel so that it falls freely; spraying fuel oil droplets onto the solid fuel while it is falling; forming a suspension of solid fuel and oil; passing the suspension of oil and solid fuel into a vessel; introducing gas under pressure into said vessel at a pressure above that of the blast being supplied to the furnace, thereby pressurizing the vessel and passing the suspension to the blast furnace by utilizing the pressure established in said vessel.

3. A method of supplying oil and solid fuel to a blast furnace comprising the steps of; heating the fuel oil to between 80° and 100° C.; causing the solid fuel to fall freely, spraying the freely falling solid fuel with heated oil as said solid fuel is falling into a vessel which contains oil previously placed therein, mixing solid fuel and oil to form a suspension; and injecting the suspension into the blast furnace.

References Cited

UNITED STATES PATENTS

| 3,001,829 | 9/1961 | De Saint-Martin | 266—28 |
| 3,166,621 | 7/1963 | Carlson | 266—29 |
| 3,157,491 | 11/1964 | Thomas et al. | 74—42 |

J. SPENCER OVERHOLSER, *Primary Examiner.*

R. D. BALDWIN, *Assistant Examiner.*